Oct. 27, 1931.  H. G. KAMRATH  1,829,401
AIR CLEANER
Filed Jan. 9, 1928   3 Sheets-Sheet 1

Inventor
Herbert G. Kamrath
By Blackmore, Spencer & Fink
Attorneys

Oct. 27, 1931.   H. G. KAMRATH   1,829,401
AIR CLEANER
Filed Jan. 9, 1928   3 Sheets-Sheet 2

Inventor
Herbert G. Kamrath
By Blackmore, Spencer & Flint
Attorneys

Oct. 27, 1931.  H. G. KAMRATH  1,829,401
AIR CLEANER
Filed Jan. 9, 1928   3 Sheets-Sheet 3

Inventor
Herbert G. Kamrath
By Blachmore, Spencer & Fluili
Attorneys

Patented Oct. 27, 1931

1,829,401

UNITED STATES PATENT OFFICE

HERBERT GEORGE KAMRATH, OF FLINT, MICHIGAN, ASSIGNOR TO A C SPARK PLUG COMPANY, OF FLINT, MICHIGAN, A COMPANY OF MICHIGAN

AIR CLEANER

Application filed January 9, 1928. Serial No. 245,404.

This invention relates to air cleaners and, particularly, to those which are adapted to be connected to the air intake conduit of the carburetor of an internal combustion engine to remove foreign matter from the air before the latter passes into the carburetor.

To be suitable for use on the air intake line of the carburetor of an internal combustion engine, an air cleaner must offer a minimum of resistance to the passage of air therethrough so that the amount of air which the engine suction is able to draw through the cleaner will at all times be sufficient to form the desired fuel-air mixture, and must, furthermore, efficiently remove foreign matter from the air before the latter passes into the carburetor.

Air cleaners of the surface-adhesion type i. e., those which consist essentially of a housing or shell having therein a passage in which is located a suitable porous medium through which the air to be cleaned passes and which is coated with a suitable liquid to which the dust in the air adheres, appear to be the most suitable for this use because, since their efficiency depends more upon the area of liquid coated surface exposed to the current of air passing through the cleaner than upon the porosity of the medium, they will be very efficient and still offer a very low resistance to the passage of air therethrough if a porous medium, which affords a large area of oil coated surface into contact with which the air must come during its passage through the cleaner and yet is sufficiently porous so that it offers very little resistance to the passage of air, is used. It is also obvious that it is highly desirable that the porous medium shall be of uniform porosity throughout as the efficiency of the cleaner will be much impaired if there are large pores in places and small pores in other places, for, in this event, the air will tend to pass through the large spaces in exclusion to the small spaces and much of the surface of the medium will be rendered useless.

It is an object of the invention to provide an air cleaner of the surface-adhesion type which is simple in construction, efficient in operation and which will offer very little resistance to the passage of air therethrough.

It is another object of the invention to provide an air cleaner made of a minimum number of parts.

It is another object of the invention to provide an air cleaner having a one piece shell or housing.

It is another object of the invention to provide in an air cleaner of the type described a porous medium of uniform porosity which will be efficient in removing foreign matter from the air to be cleaned and will offer very little resistance to the passage of air therethrough.

It is a further object of this invention to provide an air cleaner of the type described so constructed and arranged that the porous medium may be readily and easily cleaned when necessary.

It is a further object of the invention to provide a new and useful porous medium particularly adapted for use in an air cleaner of the type described. More especially it is an object of the invention to provide a porous medium having a maximum surface for a given weight and superficial volume, which is of uniform porosity, which will offer a relatively low and stable resistance to the passage of air therethrough, and which will be efficient in removing foreign matter from the air. It is a further object of the invention to provide a porous medium with the characteristics mentioned above which is capable of mass production at a reasonable cost.

Other objects of the invention will be apparent from a perusal of the following specification in which are described the several embodiments of my invention which are illustrated in the accompanying drawings.

Figure 1:
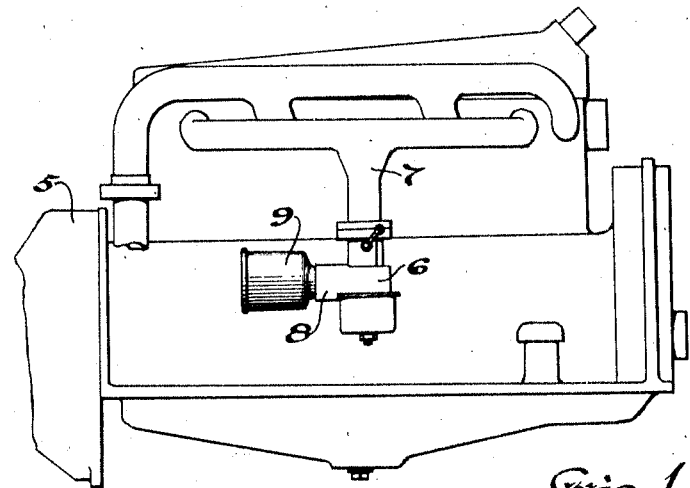
Figure 1 is a side elevation of an internal combustion engine with an air cleaner connected to the air intake conduit of the carburetor.

Referring particularly to Figures 1–6 of the drawings, the reference character 5 indicates an internal combustion engine which is provided with a carburetor 6 which is connected to the intake ports of the engine by the manifold 7 and has an air intake conduit 8 to which is connected the air cleaner 9.

Figure 3:
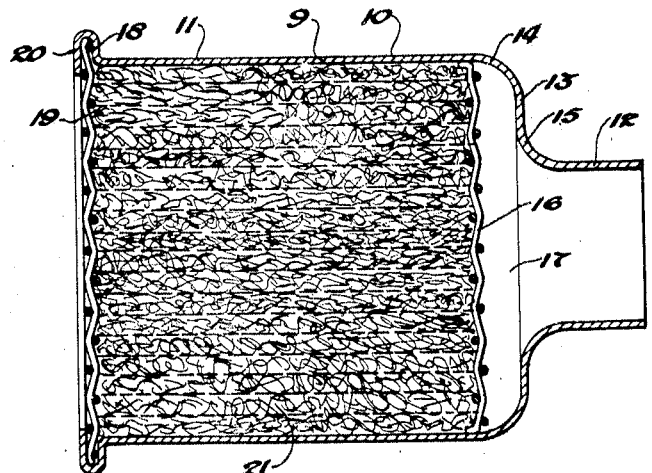
Figure 3 is a section on the line 3—3 of Figure 2.
Figure 2:
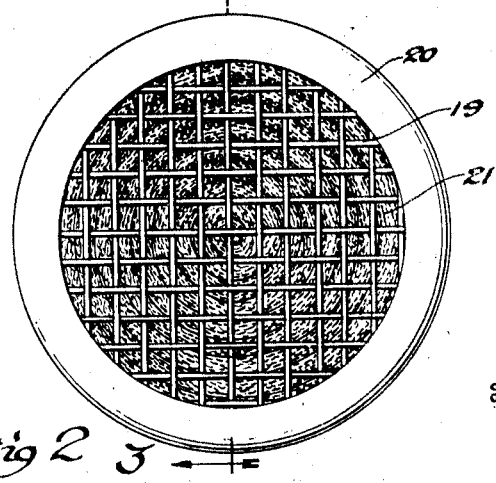
Figure 2 is an intake end elevation, on an enlarged scale, of the air cleaner shown in Figure 1.

The air cleaner shown in Figures 1–3 includes a one-piece body portion 10 consisting of a cylindrical shell 11 and a conduit 12, of smaller diameter than the shell and concentric therewith, which is joined to one end of the shell by a reducing portion 13. The side walls of the reducing portion 13 consist of a portion 14 which is arcuate and outwardly convex in cross section and into whose larger end the side walls of the shell merge tangentially, and a portion 15 which is arcuate and outwardly concave in cross section and whose larger end merges tangentially into the smaller end of the portion 14 and into whose smaller end the conduit 12 merges tangentially. Within the end of the body portion is a coarse mesh wire screen 16 of the same diameter as the internal diameter of the shell which is seated on the side walls of the body portion at approximately the line at which the side walls of the shell join the side walls of the portion 14. The screen 16 obviously is wedged between the converging side walls of the body portion at this point and is thus maintained in the above mentioned position so that a space 17 between the screen and the conduit of substantially the same diameter as that of the shell is provided. The end of the shell distant from the conduit 12 is provided with an outwardly extending circumferential flange 18 on which is seated a second coarse mesh wire screen 19 which is secured in place thereon by crimping the outer edges of the flange over the outer edges of the screen, as indicated at 20.

The porous medium 21 is located in and occupies the space within the body portion 10 between the screens 16 and 19 and is held in place thereby.

Figures 4, 5, 6, 7, 8:
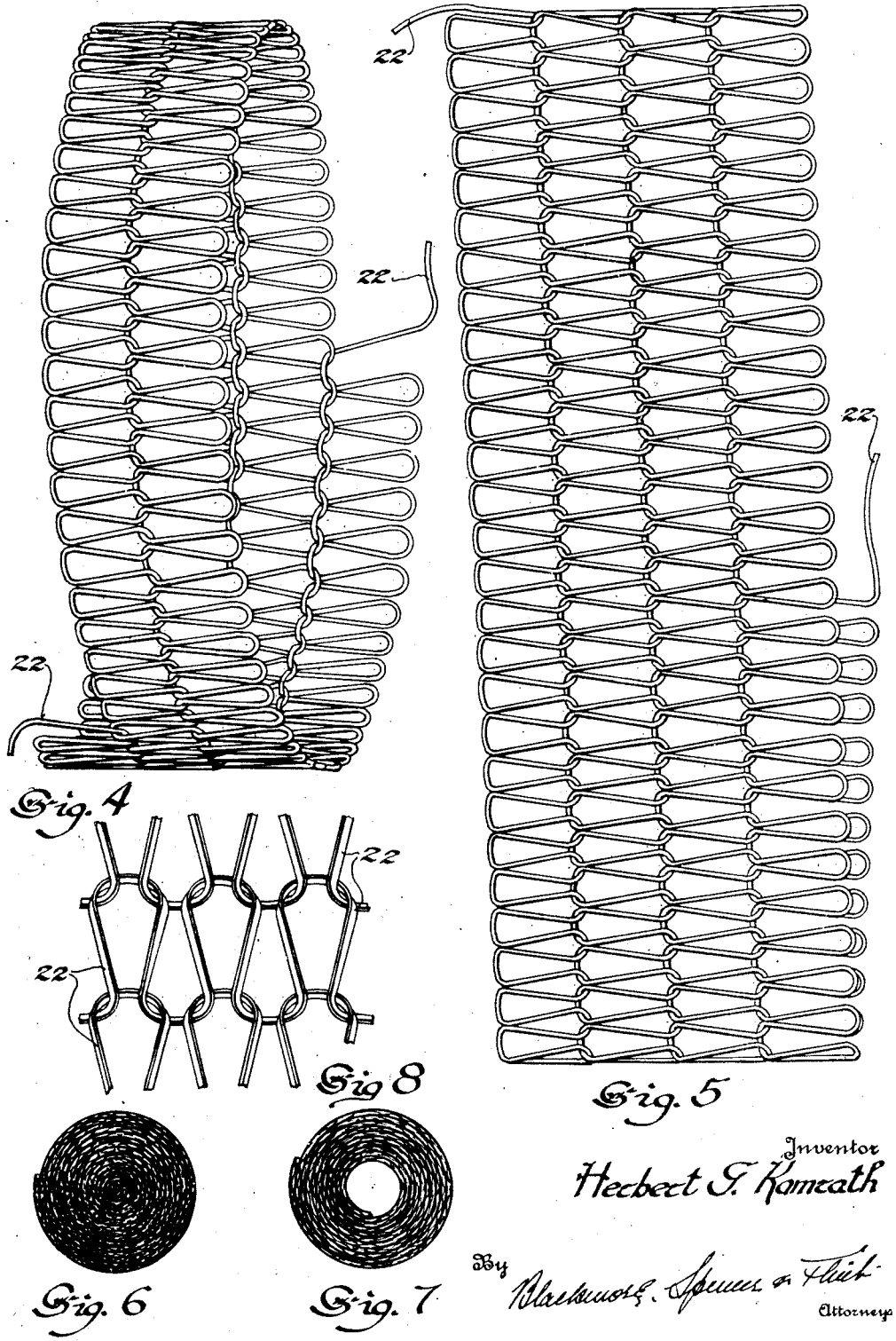
Figure 4 is a perspective view, on an enlarged scale, of a fragmentary length of tubing which is woven or knitted from flat ribbon.
Figure 5 is a perspective view, on the same scale as Figure 4, of the tubing shown in Figure 4 after it has been flattened.
Figure 6 is an end elevation, on a reduced scale, of one form of "cartridge" which may be formed by rolling up or coiling the flattened tube shown in Figure 5.
Figure 7 is an end elevation, on the same scale as Figure 6, of a modified form of "cartridge."
Figure 8 is an enlarged view showing a fragment of the tubing.

The porous medium consists of one continuous length of flat copper ribbon 22 rather loosely woven or knitted into the form of a tube (as shown in Figure 4) whose circumference is substantially equal to twice the distance between the screens 16 and 19. The tube is first flattened (as shown in Figure 5) and then rolled or coiled upon itself in the direction of the length of the tube into the form of a cylindrical "cartridge" (as shown in Figure 6) whose diameter is substantially equal to the internal diameter of the shell.

The "cartridge" is then soaked in, or wetted with, oil or other suitable liquid until all portions of the ribbon are well coated and is then positioned within the body portion 10 of the cleaner so that one end of the roll is seated on the screen 16 and the other end exposed at the flanged end of the shell, after which the screen 19 is secured over the opening in the flanged end of the shell in the manner previously described.

In operation, the conduit 12 is secured to the air intake pipe of a carburetor as shown in Figure 1. The engine suction will draw air through the screen 19 and then through the oil coated porous medium 21. During its passage through the porous medium any dust or other foreign matter carried by the air will be caught and retained by the oil film on the surface of the copper ribbon with the result that the air passing through the screen 16 will be free from foreign matter. After passing through the screen 16, the cleaned air enters the space 17 and then passes through the conduit 12 into the carburetor. The space 17 between the porous medium and the conduit 12 insures that air will pass through the outer edges as well as through the center of the porous medium for the full length thereof instead of passing only through a frusto-conical portion thereof as would be the case if the porous medium extended entirely down to the smaller end of the portion 15 and thus insures that all of the porous medium will be effective in removing dirt from the air and not only a frusto-conical portion thereof, with the remainder acting as a dead air space, as would be the case if the porous medium extended entirely down to the smaller end of the portion 15. The shape of the reducing portion 13 assures that air passing from the space 17 into the conduit 12 will flow smoothly and with a minimum of turbulence.

It is obvious that a "cartridge" of the construction described and shown, being made of flat ribbon, will have a large area of oil coated surface exposed to the air passing therethrough. Not only does the flat shape of the ribbon provide a maximum area of oil coated surface but it also provides a surface of the shape on which a maximum volume of dirt can collect before the efficiency of the cleaner is impaired and removal of the dirt is necessary. Such a "cartridge" being made of a material which is woven or knitted in a predetermined pattern, is of very uniform and stable porosity as all portions of the ribbon are positioned and remain in a definite relation to each other. The efficiency of the "cartridge" is increased by reason of the fact that the flat sides of the ribbon are necessarily inclined at various angles throughout the structure and will, therefore, act as baffles to cause a given "particle" of air to follow a tortuous path, and, therefore, come into contact with a greater area of oil coated surface, while passing through the "cartridge." With this type of porous medium, it is simple to make any number of cleaners of a given size of exactly the same resistance and efficiency by merely using the same length of tubing in each "cartridge."

When the "cartridge" has become loaded with dust or other foreign matter to the extent that it becomes necessary or desirable to clean it, this can be done by removing the air cleaner from the air intake pipe of the carburetor and soaking it in any suitable oil solvent which will remove the oil and the foreign matter carried by the cartridge. The cartridge will then be re-wetted with oil, the surplus oil drained off, and the air cleaner re-connected to the air intake pipe of the carburetor. It is obvious that the air cleaner may be used indefinitely if the cartridge is properly cleaned at suitable intervals.

Figure 10:
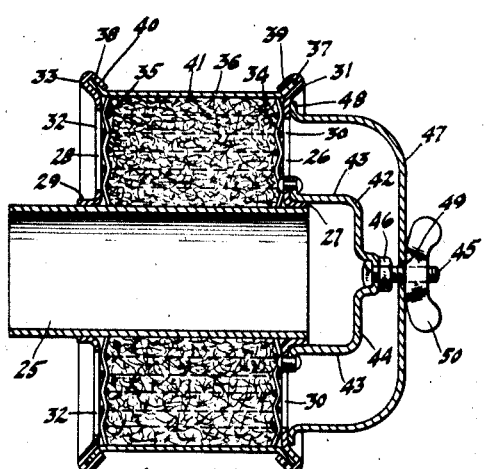
Figure 10 is a section on the line 10—10 of Figure 9.
Figure 9:
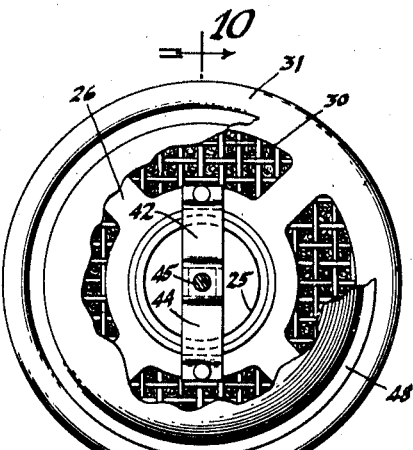
Figure 9 is an end elevation, with parts broken away, of a second form of air cleaner.

The air cleaner shown in Figures 9 and 10 includes a cylindrical conduit 25. The reference character 26 indicates an annular spacer having an inner circumferential flange 27 forming a collar surrounding and attached, as by welding, or soldering to one end of the conduit 25. At a distance from the spacer 26 and from the opposite end of the conduit 25 is a second annular spacer 28 having an inner circumferential flange 29 forming a collar surrounding and attached, as by welding or soldering, to an intermediate portion of the conduit. The spacer 26 is provided between its inner and outer edges with a plurality of relatively large sectoral openings 30, arranged symmetrically about the central opening therein, and at its outer edge is provided with a circumferential flange 31 inclined away from the spacer 28. The spacer 28 is provided with openings 32, similar to the openings 30 in the spacer 26 and similarly arranged, between its inner and outer edges, and, at its outer edge, is provided with a circumferential flange 33 inclined away from the spacer 26. Surrounding the conduit 25 and located between the two spacers are two coarse mesh screens 34 and 35, the former seated on the spacer 26 and covering the openings 30 and the latter seated on the spacer 28 and covering the openings 32. A cylindrical shell 36, provided on its opposite ends with circumferential flanges 37 and 38 seated, respectively, on the flanges 31 and 33, surrounds and is spaced circumferentially from the portion of the conduit 25 between the spacers 26 and 28. The shell 36 is secured to the spacer 26 by crimping the flange 31 over the flange 37, as indicated at 39, and to the spacer 28 by crimping the flange 33 over the flange 38, as indicated at 40.

The annular space bounded by the spacers 26 and 28, the conduit 25 and the shell 36, is completely filled by the "cartridge" 41 of porous material which holds the screens 34 and 35 in place against the spacers 26 and 28, respectively. The "cartridge" of porous material is of similar construction to that previously described. In this case, the "cartridge" is made in the form of a tube (see Figure 7) having an internal diameter equal to the external diameter of the conduit 25 and an external diameter equal to the internal diameter of the shell 36 by winding or coiling a flattened tube (whose circumference is substantially equal to twice the distance between the spacers 26 and 28) of knitted or woven copper ribbon around a cylindrical member of the same diameter as the conduit 25. This tube is then slid on the conduit 25, on which one of the spacers, the corresponding screen, and the shell 36 have already been assembled, and within the shell 36, and the remaining screen and spacer then assembled on the conduit and the latter secured thereto and to the shell. It is obvious that variations of this method of assembly are possible. If desired, the tube of woven or knitted copper ribbon may be wound directly on the conduit 25, on which one of the spacers and the corresponding screen may have been assembled, and the spacers, screens, and shell, or the remaining spacer, screen, and the shell later assembled on the conduit.

A yoke 42 has legs 43 secured to the spacer 26 on opposite sides of the conduit 25 and has a bight 44 connecting the legs and spaced outwardly from the end of the conduit. In the central portion of the bight is formed a transversely extending rib which provides on the inner side of the bight a channel-shaped groove in which is seated the head of a bolt 45 whose threaded shank extends through an opening in the bottom of the rib. The head of the bolt is held in the groove by the nut 46 and prevents turning of the bolt by its contact with the side walls of the rib. A cup-shaped cover 47 provided with a circumferential flange 48 on its rim which is seated on the spacer 26 outwardly of the openings 30 and with an opening 49 in its bottom through which the shank of the bolt 45 passes forms a closure for one end of the cleaner and is removably secured in place thereon by the wing nut 50 which is threaded on the bolt 45.

In operation, the projecting end of the conduit 25 is secured to the air intake pipe of a carburetor. The engine suction will draw air through the openings 32 and the screen 35 and then through the oil coated porous medium 41. During its passage through the porous medium any dust or other foreign matter carried by the air will be caught and retained by the oil film on the surface of the copper ribbon with the result that the air passing through the screen 34 and the openings 30 into the space between the cover 47 and the spacer 26 and then into the conduit 25 and the carburetor will be free from foreign matter.

When the "cartridge" has become loaded with dust or other foreign matter, it can be cleaned by removing the air cleaner from the air intake pipe of the carburetor and then removing the cover 47 from the cleaner and soaking the latter in any suitable oil solvent which will remove the oil and the foreign matter carried by the "cartridge." The "cartridge" will then be re-wetted with oil, the surplus oil drained off, the cover 47 secured in place, and the air cleaner re-connected to the air intake pipe of the carburetor. The fact that the cover 47 is removable is of great advantage in cleaning the "cartridge" and re-coating it with oil, as it is obvious that both of these operations can be more easily and effectively performed after the cover has been removed.

Figure 11:
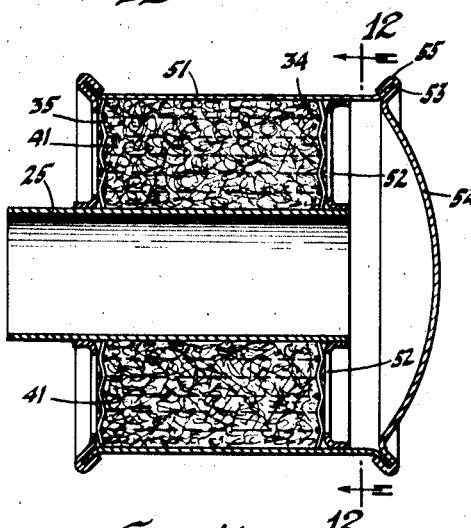
Figure 11 is a longitudinal section through a third form of air cleaner taken on the line 11—11 of Figure 12.
Figure 12:
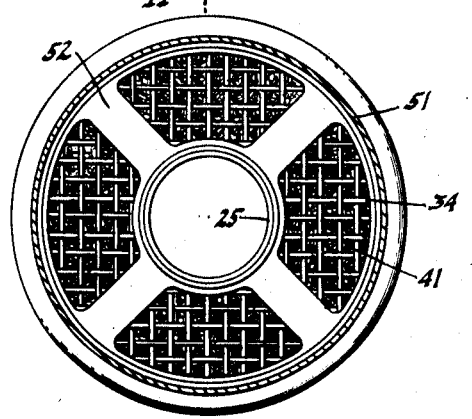
Figure 12 is a section on the line 12—12 of Figure 11.

The air cleaner shown in Figures 11 and 12 is very similar to that shown in Figures 9 and 10. In this case, however, the shell 51 extends beyond the spacer 52 and beyond the end of the conduit 25 and is secured to the outer flange on the spacer 52 by welding or soldering instead of by crimping. The end of the shell 51 outward of the pipe 25 and the spacer 52 is provided with an outwardly extending circumferential flange 53. A concavo-convex cover 54 closes this end of the cleaner and is permanently secured to the shell 51 by crimping its outer edge over the flange 53 on the shell, as indicated at 55. In all respects, except those mentioned, the cleaner shown in Figures 11 and 12 is identical with that shown in Figures 9 and 10 and for this reason further description is unnecessary.

The cleaner shown in Figures 11 and 12 operates in the same manner and may be cleaned in the same manner, as the cleaner shown in Figures 10 and 11, except that the cover 54 cannot be removed.

While I have mentioned oil as a suitable liquid with which to coat the filtering medium, it is to be understood that any other suitable liquid may be used for this purpose.

It is obvious that a porous medium of the construction disclosed in the specification and drawings will offer very little resistance to the passage of air therethrough, but will, due to the large area of oil-covered surface with which the air must come into contact during its passage therethrough very effectively and thoroughly remove particles of foreign matter from the air.

While it is desirable that the material of which the porous medium is made shall be in the form of a ribbon in order to obtain maximum surface for a given weight, and that it shall be knitted or woven into the form of a tube and then rolled up as described in order to obtain a homogeneous mass of uniform porosity, neither the particular material of which the ribbon is made nor the particular character of the weave is of great importance.

Though I have described my air cleaners as adapted for use on the carburetor of an internal combustion engine, to which use they are peculiarly adapted by virtue of their efficiency and low resistance to the passage of air, it is to be understood that they are not limited to this use but may also be used on the crankcase breather pipe, or, in fact, anywhere that an efficient, low resistance air cleaner is needed.

I claim:

1. The method of forming a dust-collecting medium for use in an air cleaner which includes, knitting a tube from flat metallic ribbon, and rolling the tube upon itself to form a cartridge.

2. The method of forming a dust-collecting medium for use in an air cleaner which includes, knitting a tube from flat metallic ribbon so that the flat sides of the ribbon are inclined at various angles throughout the tube, and rolling the tube upon itself to form a cartridge.

3. The method of forming a dust collecting medium for use in an air cleaner which includes fabricating a tube from flat metallic ribbon and rolling the tube upon itself to form a cartridge.

4. The method of forming a dust collecting medium for use in an air cleaner which includes fabricating a tube from flat metallic ribbon so that the flat sides of the ribbon are inclined at various angles throughout the tube, and rolling the tube upon itself to form a cartridge.

In testimony whereof I affix my signature.

HERBERT GEORGE KAMRATH.